United States Patent
Tanaka

(10) Patent No.: US 9,730,195 B2
(45) Date of Patent: Aug. 8, 2017

(54) RADIO COMMUNICATION METHOD, RADIO COMMUNICATION SYSTEM, RADIO STATION, AND RADIO TERMINAL

(71) Applicant: FUJITSU LIMITED, Kawasaki-shi, Kanagawa (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/487,670

(22) Filed: Sep. 16, 2014

(65) Prior Publication Data

US 2015/0004992 A1 Jan. 1, 2015

Related U.S. Application Data

(63) Continuation of application No. PCT/JP2012/001904, filed on Mar. 19, 2012.

(51) Int. Cl.
H04W 72/04 (2009.01)
H04B 7/024 (2017.01)
H04W 72/08 (2009.01)

(52) U.S. Cl.
CPC ........ *H04W 72/0406* (2013.01); *H04B 7/024* (2013.01); *H04W 72/085* (2013.01); *H04W 72/046* (2013.01)

(58) Field of Classification Search
None
See application file for complete search history.

(56) References Cited

U.S. PATENT DOCUMENTS

2007/0140207 A1* 6/2007 Narushima ........... H04W 68/00 370/345
2010/0022245 A1* 1/2010 Sato ...................... H04W 48/14 455/436

(Continued)

FOREIGN PATENT DOCUMENTS

JP 2010-258612 11/2010
JP 2011-35910 A 2/2011

(Continued)

OTHER PUBLICATIONS

International Search Report issued for corresponding PCT Application No. PCT/JP2012/001904, mailed May 22, 2012.

(Continued)

*Primary Examiner* — Diane Mizrahi
(74) *Attorney, Agent, or Firm* — Myers Wolin, LLC

(57) ABSTRACT

A radio communication method, includes: notifying a radio terminal of first set information, from at least one communication point among a plurality of communication points, based on information of a reception level on the radio terminal, the first set information specifying one or more candidates of reception points to receive a signal transmitted from the radio terminal among one or more communication points capable of coordinated communication from the plurality of communication points; and notifying the radio terminal of second set information, from at least one communication point among the plurality of communication points, in reception of a signal from the radio terminal, the second set information specifying one or more reception points to be used for reception of a signal transmitted by the radio terminal among one or more reception points specified in the first set information.

10 Claims, 20 Drawing Sheets

(56) References Cited

U.S. PATENT DOCUMENTS

| | | | |
|---|---|---|---|
| 2010/0203887 A1 | 8/2010 | Kim | |
| 2011/0034163 A1 | 2/2011 | Zhu et al. | |
| 2013/0163543 A1* | 6/2013 | Freda | H04W 72/0406 370/329 |
| 2013/0301542 A1* | 11/2013 | Krishnamurthy | H04W 52/50 370/329 |
| 2013/0315195 A1* | 11/2013 | Ko | H04W 72/082 370/329 |
| 2014/0011535 A1* | 1/2014 | Jeon | H04W 52/241 455/522 |
| 2014/0133418 A1* | 5/2014 | Takeda | H04L 1/0027 370/329 |
| 2014/0153536 A1* | 6/2014 | Ouchi | H04W 52/146 370/329 |
| 2014/0198680 A1* | 7/2014 | Siomina | H04L 5/14 370/252 |
| 2015/0085787 A1* | 3/2015 | Ouchi | H04L 5/0037 370/329 |
| 2015/0195732 A1* | 7/2015 | Ouchi | H04W 48/16 370/252 |
| 2015/0201369 A1* | 7/2015 | Ng | H04W 48/16 370/254 |

FOREIGN PATENT DOCUMENTS

| | | |
|---|---|---|
| JP | 2012-504365 A | 2/2012 |
| WO | 2010/039066 A1 | 4/2010 |

OTHER PUBLICATIONS

CHTTL; "Discussions on CoMP Cooperating Set"; Agenda Item: 15.2; Discussion; R1-092833; Los Angeles, USA; Jun. 29-Jul. 3, 2009.

ETSI TS 136 211 V10.2.0; Technical Specification; "LTE; Evolved Universal Terrestrial Radio Access (E-UTRA); Physical channels and modulation (3GPP TS 36.211 version 10.2.0 Release 10)"; Jun. 2011.

3GPP TR 36.814 V9.0.0; Technical Report; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010.

Intel Corporation, "A Signaling Framework for UL CoMP", Agenda Item: 7.5.6.3, R1-120206, 3GPP TSG RAN WG1 #68, Dresden, Germany, Feb. 6-10, 2012.

Huawei et al., "RRM measurements on CSI-RS", Agenda Item: 7.5.2.3, R1-113644, 3GPP TSG RAN WG1 meeting #67, San Francisco, USA, Nov. 14-18, 2011.

InterDigital, "Analysis of Feedback Mechanisms for CoMP", Agenda Item: 15.2, R1-092585, 3GPP TSG RAN WG1 Meeting #57bis, Los Angeles, USA, Jun. 29-Jul. 3, 2009.

Extended European search report with the supplementary European search report and the European search opinion issued for corresponding European Patent Application No. 12871829.3 dated Feb. 26, 2015.

Notice of Preliminary Rejection issued for corresponding Korean Patent Application 10-2014-7025728 dated Jun. 20, 2015 with an English translation.

Notification of Reasons for Refusal issued by the Japan Patent Office for corresponding Japanese Patent Application No. 2016-041346, mailed on Dec. 13, 2016, with an English translation.

Notification of Reasons for Refusal issued for corresponding Japanese Patent Application No. 2014-505789 dated Oct. 20, 2015 with an English translation.

First Notification of Office Action issued by the State Intellectual Property Office of China for corresponding Chinese Patent Application No. 201280071516.4, dated Jun. 2, 2017, with an English translation.

Decision of Refusal issued for Japanese Patent Application No. 2016-041346, dated Jun. 13, 2017, with full machine translation.

* cited by examiner

FIG. 13

| VALUE | RP set | 100A |
|---|---|---|
| 000 | Reserved |
| 001 | {1} |
| 010 | {2} |
| 011 | {1,2} |
| 100 | {3} |
| 101 | {1,3} |
| 110 | {2,3} |
| 111 | {1,2,3} |

FIG. 14

| VALUE | RP set |
|---|---|
| 000 | {1} |
| 001 | {2} |
| 010 | {1,2} |
| 011 | {3} |
| 100 | {1,3} |
| 101 | {2,3} |
| 110 | {1,2,3} |
| 111 | Reserved |

| VALUE | RP set |
|---|---|
| 000 | {1} |
| 001 | {2} |
| 010 | {3} |
| 011 | {1,2} |
| 100 | {1,3} |
| 101 | {2,3} |
| 110 | {1,2,3} |
| 111 | Reserved |

100C

RADIO COMMUNICATION METHOD, RADIO COMMUNICATION SYSTEM, RADIO STATION, AND RADIO TERMINAL

CROSS-REFERENCE TO RELATED APPLICATION

This application is a continuation application of International Application PCT/JP2012/001904 filed on Mar. 19, 2012, the entire contents of which are incorporated herein by reference.

FIELD

The present invention relates to a radio communication method, radio communication system, radio station, and radio terminal.

BACKGROUND

Recent years, in radio communication systems such as a mobile phone system, the next generation radio communication technology has been discussed in order to achieve further speed-up and capacity enlargement of radio communication. For example, in the 3GPP (3rd generation partnership project), which is a standardization organization, a telecommunication standard called LTE (long term evolution) and telecommunication standard called LTE-A (LTE-advanced), which is constructed based on the radio communication technology of the LTE, have been proposed.

In the LTE-A system or the like, in order to reduce inter-cell interference and improve reception signal strength, Coordinated MultiPoint (coordinated multipoint, hereinafter also denoted as CoMP) communication has been studied. In the coordinated multipoint communication, a plurality of geographically-dispersed communication points carry out a coordinated communication. Each communication point corresponds to, for example, a base station, communication unit, antenna, or a cell formed with these entities. With this technology, an adjustment to transmission or reception between multiple points is carried out. For example, in the downlink coordinated multipoint communication, a method to carry out joint transmission from a plurality of communication points to a radio terminal has been studied. For example, in the uplink coordinated multipoint communication, a method to carry out joint processing to signals received by a plurality of points while carrying out communication between the points has been studied.

CITATION LIST

Non Patent Literature

NPL 1: 3GPP TS36.211 V10.2.0(2011-06)
NPL 2: 3GPP TR36.814 V9.0.0(2010-03)

SUMMARY

According to an aspect of the invention, a radio communication method includes: notifying a radio terminal of first set information, from at least one communication point among a plurality of communication points, based on information of a reception level on the radio terminal, the first set information specifying one or more candidates of reception points to receive a signal transmitted from the radio terminal among one or more communication points capable of coordinated communication from the plurality of communication points; and notifying the radio terminal of second set information, from at least one communication point among the plurality of communication points, in reception of a signal from the radio terminal, the second set information specifying one or more reception points to be used for reception of a signal transmitted by the radio terminal among one or more reception points specified in the first set information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a table illustrating an example of control information for the notification of the RP set according to the second embodiment;

FIG. 14 is a table illustrating an example of the control information for the notification of the RP set according to the second embodiment;

FIG. 15 is a table illustrating an example of the control information for the notification of the RP set according to the second embodiment;

DESCRIPTION OF EMBODIMENTS

Embodiments of a radio communication method, radio communication system, radio station, and radio terminal the present disclosure discloses will be described below with reference to the drawings. However, the following embodiments do not limit the radio communication method, radio communication system, radio station, and radio terminal the present disclosure discloses.

In order to achieve a reduction in inter-point interference and an improvement in reception signal strength by the coordinated multipoint communication, proper coordination between points has to be carried out by taking into consideration a delay of control and increase in signaling. For example, in the uplink coordinated multipoint communication, it is supposed that reception points to be actually used in signal reception have to be adjusted from among communication points capable of coordinated multipoint communication. Moreover, there is a possibility that a lot of communication points capable of coordinated communication exist and the number and combinations of reception points to be actually used may change varyingly. In this processing, if, for proper uplink transmission control, information on reception points to be used is notified successively at the adjustment timing, it may cause an increase in signaling, leading to an interruption in improvement of communication performance.

Accordingly, The disclosed technology is invented, for example, in consideration of the above-described problems and an object of the present disclosure is to provide a radio communication method, radio communication system, radio station, and radio terminal capable of improving communication performance in the coordinated multipoint communication.

First Embodiment

Figure 1:
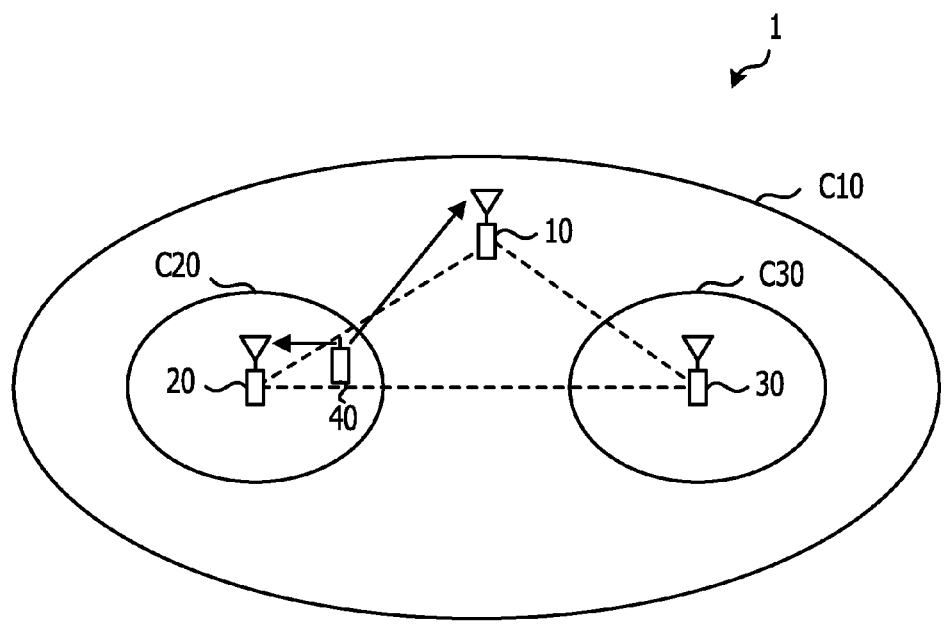
FIG. 1 is a diagram illustrating a configuration of a radio communication system according to a first embodiment.

FIG. 1 illustrates a configuration of a radio communication system 1 according to a first embodiment. As illustrated in FIG. 1, the radio communication system 1 has radio stations 10, 20, and 30 and a radio terminal 40. The radio stations 10, 20, and 30 have antennas individually and are arranged at locations apart from one another. Each of the radio stations 10, 20, and 30 corresponds to a communication point. The radio station 10 forms a cell C10 and the radio stations 20 and 30 form cells C20 and 30, respectively, which overlap the cell C10. The radio terminal 40 is located in the cell C10 and cell C20.

The radio stations 10, 20, and 30 communicate with one another among the radio stations 10, 20, and 30 via a wired connection or radio connection. The radio stations 10, 20, and 30 are also capable of CoMP communication with the radio terminal 40. For example, in the downlink CoMP communication with the radio terminal 40, joint transmission in which data is transmitted by using radio resources of the same time and frequency is performed from one or more communication points selected from among the radio stations 10, 20, and 30 as a set used in the downlink CoMP communication to the radio terminal 40. Furthermore, for example, in the uplink CoMP communication with the radio terminal 40, data from the radio terminal 40 is received by one or more communication points selected from among the radio stations 10, 20, and 30 as a set used in the uplink CoMP communication, respectively, and joint processing in which the received signals are combined among the communication points is carried out.

Although, in the example in FIG. 1, the cells C20 and C30 the radio stations 20 and 30 form are included in the cell C10 the radio station 10 forms, the configuration is not limited to this style and it is sufficient that the radio stations 10 to 30 are CoMP-communicable.

Moreover, the radio stations 10 to 30 are, for example, connected to a higher-level device, respectively, via a wired connection and the higher-level device is connected to the network via a wired connection. The radio stations 10 to 30 are also configured to be able to transmit and receive data and control information via the higher-level device or the network.

Figure 2:
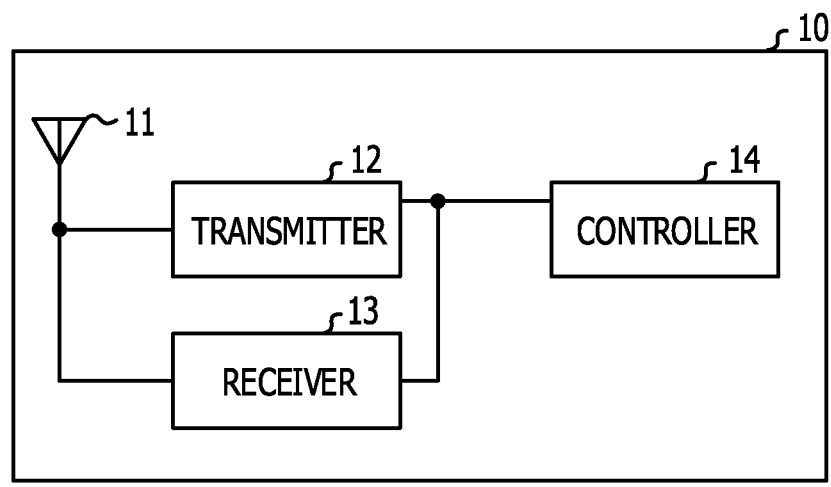
FIG. 2 is a functional block diagram illustrating a configuration of a radio station according to the first embodiment.

FIG. 2 is a functional block diagram illustrating the configuration of the radio station 10. As illustrated in FIG. 2, the radio station 10 has an antenna 11, transmitter 12, receiver 13, and controller 14. These components are connected so as to be able to input and output a signal and data in one direction or both directions. The functional configuration and hardware configuration of the radio stations 20 and 30 are similar to the functional configuration and hardware configuration of the radio station 10.

The transmitter 12 transmits a data signal and control signal via the antenna 11. The signals to be transmitted include, for example, a signal announcing system information, a L1/L2 (Layer 1/Layer 2) control signal such as L1 (Layer 1) signaling and MAC (medium access control) signaling, and a higher layer control signal such as RRC (radio resource control) signaling.

The receiver 13 receives a data signal and control signal transmitted by the radio terminal 40 via the antenna 11. The signals to be received include, for example, a signal to establish a connection and a signal indicating reception quality on the radio terminal 40. The antenna 11 may be configured to be a separate entity for transmission and reception, respectively.

The controller 14 acquires information and signals from the higher-level device or other radio stations via a wired connection or radio connection. The controller 14 outputs data and control information to be transmitted to the transmitter 12. The controller 14 inputs data and control information to be received from the receiver 13.

The controller 14 makes the transmitter 12 transmit the control information. The controller 14 also makes the transmitter 12 transmit a reference signal for the acquisition (measurement) of reception quality and decoding of received signals.

The control information includes, for example, system information, RRC information, and L1/L2 control information. The system information is, for example, announced as annunciation information in the cell C10 via an annunciation channel or a shared channel specified by the annunciation channel. Alternatively, the system information is, for example, notified via an individual data channel specified by an individual control channel. The RRC information is, for example, notified by RRC signaling via an individual data channel specified by an individual control channel. The L1/L2 control information is, for example, notified by L1 signaling or MAC signaling via an individual control channel.

The system information is, for example, transmitted with being contained in an MIB (master information block) or SIB (system information block). The system information, for example, includes master information of the system and configuration information to establish a connection.

The RRC information includes control information for the acquisition of reception quality on the radio terminal 40. The control information for the acquisition of reception quality includes, for example, information on a reference signal to the communication point at which the radio terminal 40 acquires the reception quality.

The RRC information also includes first set information which specifies a set of candidate communication points, which are candidates to carry out the CoMP communication with a predetermined radio terminal, of a plurality of CoMP-communicable communication points. The first set information includes information specifying a set of reception points which are candidates to receive a signal in the uplink CoMP communication (candidate reception point set).

The L1/L2 control information includes, for example, second information specifying which communication point, of a candidate communication point set notified to a predetermined radio terminal in advance, is actually used. The second set information includes information specifying a set of reception points, of the candidate reception point set, to be actually used (active reception point set). The L1/L2 control signal is notified at a higher frequency than the higher-layer control signal.

The controller 14 determines a set of reception points, which are candidates, of CoMP-communicable communication points, to receive a signal from the radio terminal 40 based on information on the reception quality on the radio terminal 40. The controller 14 also determines which reception points in the candidate reception point set notified in advance are actually used, based on usage status or the like of radio resources, when data transmission from the radio terminal 40 is carried out.

Figure 3:
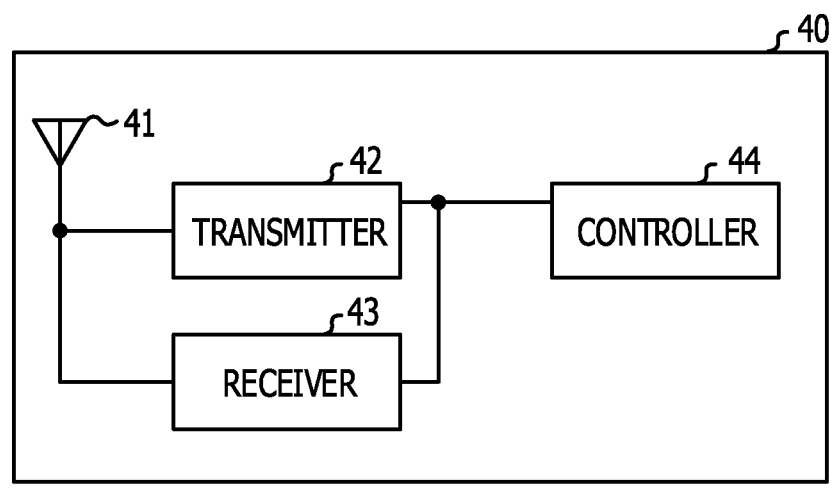
FIG. 3 is a functional block diagram illustrating a configuration of a radio terminal according to the first embodiment.

FIG. 3 is a functional block diagram illustrating a configuration of the radio terminal 40. As illustrated in FIG. 3, the radio terminal 40 has an antenna 41, transmitter 42, receiver 43, and controller 44. These component sections are interconnected so as to be able to input and output signals and data in one direction or both directions.

The transmitter 42 transmits a data signal and control signal via the antenna 41. The signals to be transmitted include, for example, a signal to establish a connection, a signal requesting a scheduling for data transmission, and a signal to notify information on reception quality.

The receiver 43 receives a data signal and control signal transmitted by a radio terminal via the antenna 41. The antenna 41 may be configured to be a separate entity for transmission and reception, respectively.

The controller 44 outputs data and control information to be transmitted to the transmitter 42. The controller 44 also inputs data and control information received from the receiver 43. For example, based on the control information on the acquisition of reception quality notified by the radio station 10, the controller 44 acquires, from the reference signals received from the radio stations 10, 20, and 30, a reception signal of the reference signal of each communication point and reception quality for each communication point. The controller 44 notifies the radio station 10 of the acquired reception quality for each communication point and, based on the first set information notified by the radio station 10, acquires a set of candidate reception points which are candidates to receive signals in the uplink CoMP communication. The controller 44, when data is transmitted, acquires which reception point in the notified candidate reception point set is actually used based on the second set information notified by the radio station 10 and transmits the data to the reception points.

Figure 4:
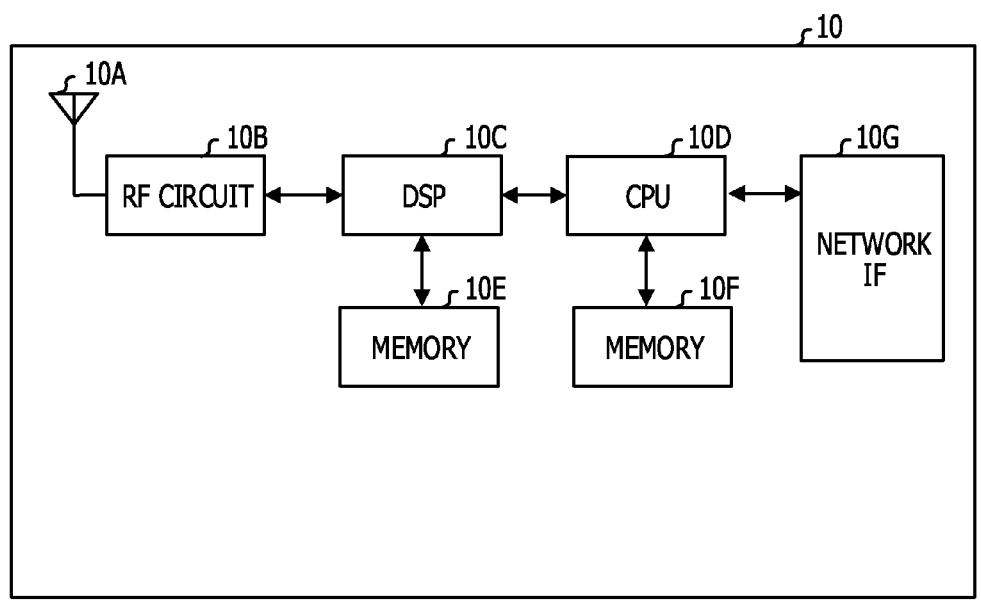
FIG. 4 is a diagram illustrating a hardware configuration of the radio station according to the first embodiment.

FIG. 4 is a diagram illustrating a hardware configuration of the radio station 10. As illustrated in FIG. 4, the radio station 10 has, for example, an RF (radio frequency) circuit 10B equipped with an antenna 10A, a DSP (digital signal processor) 10C, a CPU (central processing unit) 10D, memories 10E and 10F, and a network IF (interface) 10G, as hardware components. The CPU 10D is connected so as to be able to input and output various signals and data via the network IF 10G such as a switch. The memories 10E and 10F include, for example, at least one of a RAM (random access memory) such as an SDRAM (synchronous dynamic random access memory), a ROM (read only memory), and a flash memory and store programs, control information, and data. The transmitter 12 and receiver 13 are implemented by, for example, the RF circuit 10B. The controller 14 is implemented by, for example, an integrated circuit such as the DSP 10C or an integrated circuit such as the CPU 10D.

Figure 5:
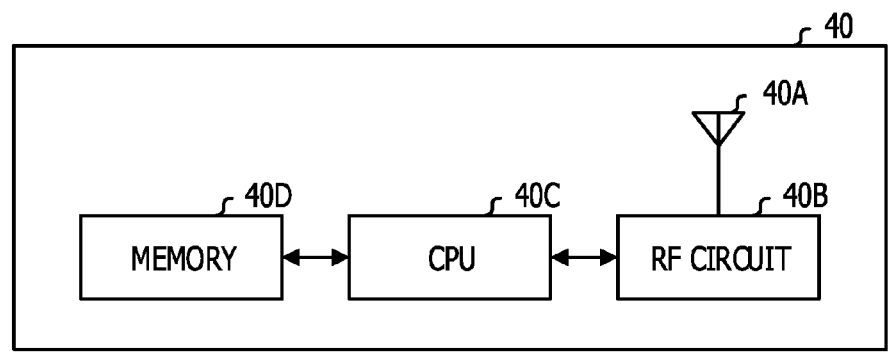
FIG. 5 is a diagram illustrating a hardware configuration of the radio terminal according to the first embodiment.

FIG. 5 is a diagram illustrating a hardware configuration of the radio terminal 40. As illustrated in FIG. 5, the radio terminal 40 has, for example, an RF circuit 40B equipped with an antenna 40A, a CPU 40C, and a memory 40D, as hardware components. The radio terminal 40 may also have a display device such as an LCD (liquid crystal display), which is connected to the CPU 40C. The memory 40D includes at least one of a RAM such as, for example, an SDRAM, a ROM, and a flash memory and stores programs, control information, and data. The transmitter 42 and receiver 43 are implemented by, for example, the RF circuit 40B. The controller 44 is implemented by, for example, an integrated circuit such as the CPU 40C.

Figure 6:
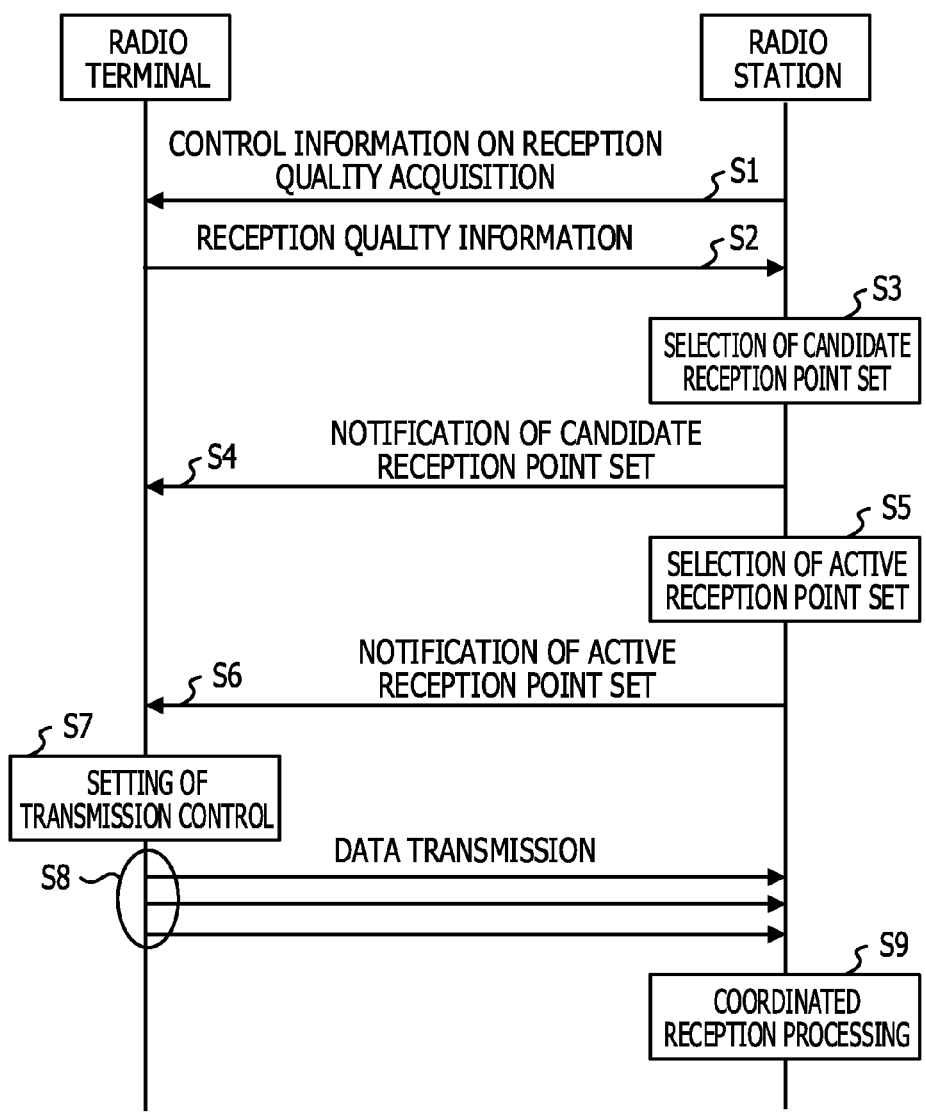
FIG. 6 is a sequence diagram to describe an operation of the radio communication system according to the first embodiment.

Next, an operation of the radio communication system 1 in the first embodiment will be described. FIG. 6 is a sequence diagram to describe an operation of the CoMP communication in the radio communication system 1.

First, as a precondition, in the radio communication system 1, the radio stations 10, 20, and 30 are placed so as to be able to carry out the CoMP communication as communication points individually, as described above. The radio station 10 is a serving cell for the radio terminal 40 and collectively carries out CoMP processing among the radio stations 10, 20, and 30. When data communication is carried out, communication points the radio terminal 40 actually uses in the CoMP communication are determined from CoMP-communicable communication points. In this process, the communication points to be actually used are dynamically adjusted in a relatively short cycle by the radio station 10. After the adjustment, information specifying the communication points to be actually used is notified to the radio terminal 40. The radio terminal 40 transmits data to the notified communication points to be actually used. The communication points may be specified by, for example, pre-assigned identification information. The identification information of each communication point supposedly has, for example, a length of about 8 bits.

In this process, in the radio communication system 1, the number of CoMP-communicable communication points is variable and there is a possibility that a lot of CoMP-communicable communication points exist. Moreover, a set of communication points to be actually used may vary for each dynamic adjustment and their number and combinations may change varyingly. In order to transmit the identification information of such varyingly changeable communication points, a relatively large radio resource has to be obtained. For a reduction in inter-point interference or an improvement in reception signal strength, such identification information is successively notified to the radio terminal 40 at the timings of the adjustments and the radio terminal 40 carries out transmission control by following the notification. In this process, such notification of identification information may cause an increase in signaling, which leads to an interruption in the improvement of communication performance.

Therefore, in the first embodiment, the operation of the CoMP communication is carried out as described below.

As illustrated in FIG. 6, the radio station 10 notifies control information on the acquisition of reception quality by the radio terminal 40 (S1). The control information on the acquisition of reception quality includes, for example, information on a reference signal of each communication point for which the reception quality is acquired. This notification is carried out by, for example, RRC signaling.

Next, the radio terminal 40, using the received control information, receives reference signals from a plurality of predetermined communication points of CoMP-communicable communication points and acquires reception quality for each communication point. Then, the radio terminal 40 transmits information on the reception quality for each communication point to the radio station 10 (S2).

Next, the radio station 10, based on the information on the reception quality for each communication point on the radio terminal 40, selects a candidate reception point set (candidate RP (reception point) set), the members of which are candidates, of a plurality of CoMP-communicable transmission points, to receive a signal from the radio terminal 4 in the uplink CoMP communication (S3). For example, the predetermined number of communication points in decreasing order of reception quality or, of the communication points, communication points that have reception quality values higher than a predetermined level are selected. With this method, fewer communication points than the number of all CoMP-communicable communication points are selected as the candidate reception point set.

Next, the radio station 10 notifies the radio terminal 40 of the candidate reception point set (S4). This notification is carried out by, for example, RRC signaling. In this process, because fewer communication points than the number of all CoMP-communicable communication points are selected as the candidate reception point set, the amount of signaling is reduced from the case in which the identification information of all communication points is notified. In this notification, the radio station 10 may also transmit a set of transmission control parameters corresponding to the candidate reception point set.

Next, the radio station 10, at a time of scheduling for signal reception from the radio terminal 40, selects an active reception point set (active RP set), which are actually used to receive a signal (S5).

Next, the radio station 10 notifies the radio terminal 40 of the active reception point set (S6). The active reception point set is notified by, for example, L1 signaling or MAC signaling via an individual control channel. The L1 signaling or MAC signaling is transmitted periodically or aperiodically with a period of, for example, 1 msec. Because of control execution in such a relatively short cycle, the CoMP communication may be carried out by following fluctuation or the like in the propagation environment properly to adjust communication points. In this notification, the active reception point set is notified as information presented by a bitmap format in which whether or not each reception point included in the candidate reception point set is used is specified by {0, 1}. With this information format, the amount of signaling is reduced from the case in which the identification information itself of each reception point to be actually used is notified.

Next, the radio terminal 40, according to the active reception point set, carries out transmission control setting (S7). The information to be set includes, for example, a computing method of transmission power, parameters used in the computation of transmission power, and so on. With this information, the transmission control setting is carried out properly according to the reception points to be actually used.

Next, the radio terminal 40 transmits data according to the set transmission control (S8). The transmitted data is received by each reception point.

Next, the radio station 10 acquires the signals received by each reception point and carries out coordinated reception processing (for example, combining processing) (S9). With this processing, a reduction in inter-communication point interference and an improvement in reception signal strength are achieved.

As described above, according to the first embodiment, communication performance may be improved in the radio communication system which carries out the CoMP communication.

In the first embodiment, the radio communication system 1 may implement, for example, the radio stations 10, 20, and 30 as base stations. In this case, the radio stations 10, 20, and 30 may be implemented as, for example, independent eNodeBs (evolved Node B). Alternatively, in the first embodiment, the radio communication system 1 may implement, for example, the radio station 10 as a control unit of a base station and the radio stations 20 and 30 as remote units of the base station. In this case, the control unit may be implemented, for example, as a concentrated eNodeB and the remote units may be implemented, for example, as RRHs (remote radio head) the concentrated eNodeB has. The control unit, for example, is connected to the remote unit via a wired connection such as an optical cable. The control unit forms a cell and the remote units form cover areas each of which overlaps the cell. In this case, the control unit and remote units may use common cell identification information.

In the first embodiment, the first set information may include information specifying a set of candidate transmission points (candidate transmission point set), which are candidates to transmit a signal in the downlink CoMP communication, and communication control parameters corresponding to the candidate transmission points. In this configuration, the first set information may be information specifying the union of a set of candidate reception points and a set of candidate transmission points. Information of a set of communication control parameters corresponding to the candidate transmission point set may also be notified together. The second set information may include information specifying a set of transmission points to be actually used (active transmission point set) of the candidate transmission point set or the union of the candidate reception point set and candidate transmission point set. With this configuration, because the identification information of communication points to be notified may be reduced by an overlapping portion of candidate reception points and candidate transmission points, the amount of signaling may be reduced, causing communication performance may be improved.

Although the radio communication system 1 is configured to have three radio stations 10, 20, and 30, the configuration is not limited to this and the number of radio stations is arbitrary.

Second Embodiment

A radio communication system according to a second embodiment has three radio stations 50 and a radio terminal 70. The overall configuration of the radio communication system according to the second embodiment is similar to the radio communication system 1 illustrated in FIG. 1.

Figure 7:
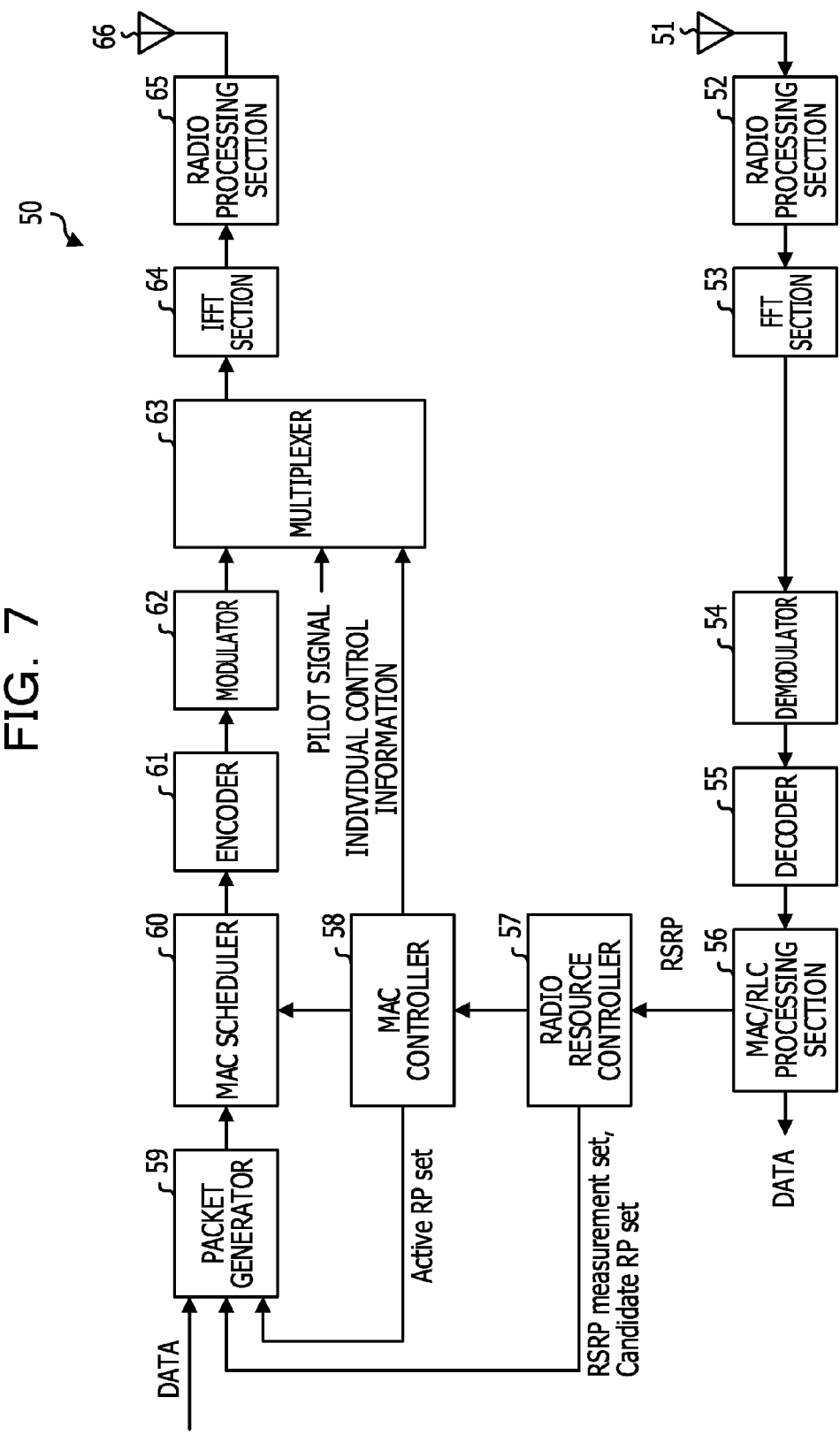
FIG. 7 is a functional block diagram illustrating a configuration of a radio station in a radio communication system according to a second embodiment.

FIG. 7 is a functional block diagram illustrating a configuration of the radio station 50 in the radio communication system according to the second embodiment. As illustrated in FIG. 7, the radio station 50 has a reception antenna 51, radio processing section 52, FFT (fast Fourier transform) section 53, demodulator 54, decoder 55, MAC/RLC (medium access control/radio link control) processing section 56, radio resource controller 57, MAC controller 58, packet generator 59, MAC scheduler 60, encoder 61, modulator 62, multiplexer 63, IFFT (inverse fast Fourier transform) section 64, radio processing section 65, and transmission antenna 66.

The reception antenna 51 receives and outputs a radio signal to the radio processing section 52. The radio station 50 may have a plurality of reception antennas. The reception antenna 51, together with the transmission antenna 66, may be configured as a transmission/reception antenna which is switched between for transmission use and for reception use by a transmission/reception switching section or the like. The reception antenna 51, for example, receives uplink signals via an uplink data channel or control channel. The channels to receive signals include a PRACH (physical random access channel), PUSCH (physical uplink shared channel), and PUCCH (physical uplink control channel). The uplink signals include a reference signal RS (reference signal), control signal, and data signal. The uplink signals include, for example, a signal notifying information which indicates reception quality for each communication point on the radio terminal 40.

The radio processing section 52 carries out processing such as A/D (analog to digital) conversion to reception signals. The FFT section 53 carries out FFT processing to digital signals. The demodulator 54 carries out demodulation processing to the FFT-processed signals based on control information notified or stored in advance or a reference signal for demodulation. The decoder 55 carries out decoding processing to the demodulated signals based on the control information notified or stored in advance or a channel estimate value estimated from the reference signal. The decoding processing is, for example, carried out by using the channel estimate value of the PUSCH estimated by using the reference signal.

The MAC/RLC processing section 56 carries out re-ordering processing or the like to the decoded signals and acquires and outputs received data. The received data is, for example, stored in a reception buffer and processed by an application processing section. The MAC/RLC processing section 56 also outputs reception quality acquired from the received data, control information, and so on. The MAC/RLC processing section 56 outputs to the radio resource controller 57 ACK (acknowledgement) or NACK (negative acknowledgement) as the decoding result of the data signal.

The radio resource controller 57 determines control information on the acquisition of reception quality on the radio terminal 70 based on information on CoMP-communicable communication points acquired from a higher-level device or the like and outputs the control information to the packet generator 59. The control information on the acquisition of reception quality includes, for example, information on the communication points for which the reception quality is measured. The information on the communication points for which the reception quality is measured includes, for example, an RSRP measurement set specifying a set of the communication points for which RSRP (reference signal received power) is measured. The radio resource controller 57 also determines a candidate RP set (candidate RP set) based on the reception quality for each communication point acquired by the radio terminal 40. For example, the candidate RP set is determined based on an RSRP report which notifies the RSRP measured at each communication point as information indicating the reception quality for each communication point on the radio terminal 70. The radio resource controller 57 also carries out scheduling for the reception of a signal from the radio terminal 70 and notifies the MAC controller 58 of the scheduling result.

The MAC controller 58 outputs to the packet generator 59 data specifying an active RP set (active RP set) which is determined by scheduling for the reception of a signal from the radio terminal 70. The MAC controller 58 also notifies the MAC scheduler 60 of control information for MAC scheduling. The MAC controller 58 also outputs to the multiplexer 63 a control signal to be transmitted via a PDCCH (physical downlink control channel).

The packet generator 59 generates packets from user data, the candidate RP set information, the active RP set information, or the RSRP measurement set information. The user data, for example, is acquired from a higher-level device or other radio station and stored in a transmission buffer.

The MAC scheduler 60 carries out processing such as the allocation of the generated packets to a transport block.

The encoder 61 encodes transmission data based on the control information. The modulator 62 modulates the encoded data based on the control information. The multiplexer 63 allocates the modulated transmission data, a reference signal (pilot signal), an individual control signal (PDCCH), and so on to a radio resource.

The IFFT section 64 carries out IFFT processing to the multiplexed signal. The radio processing section 65 carries out A/D conversion, distortion compensation processing, amplification processing, and so on to the signal after the IFFT processing and outputs the signal to the transmission antenna 66.

The transmission antenna 66 transmits the radio signal input from the radio processing section 65. The radio station 50 may have a plurality of transmission antennas. The transmission antenna 66 transmits a downlink signal via, for example, a downlink data channel or control channel. The signal transmission channels include, for example, a synchronization channel PSCH (physical synchronization channel), annunciation channel PBCH (physical broadcast channel), PDSCH (physical downlink shared channel), and PDCCH. The downlink signals include the reference signal, control signal, and data signal.

Figure 8:
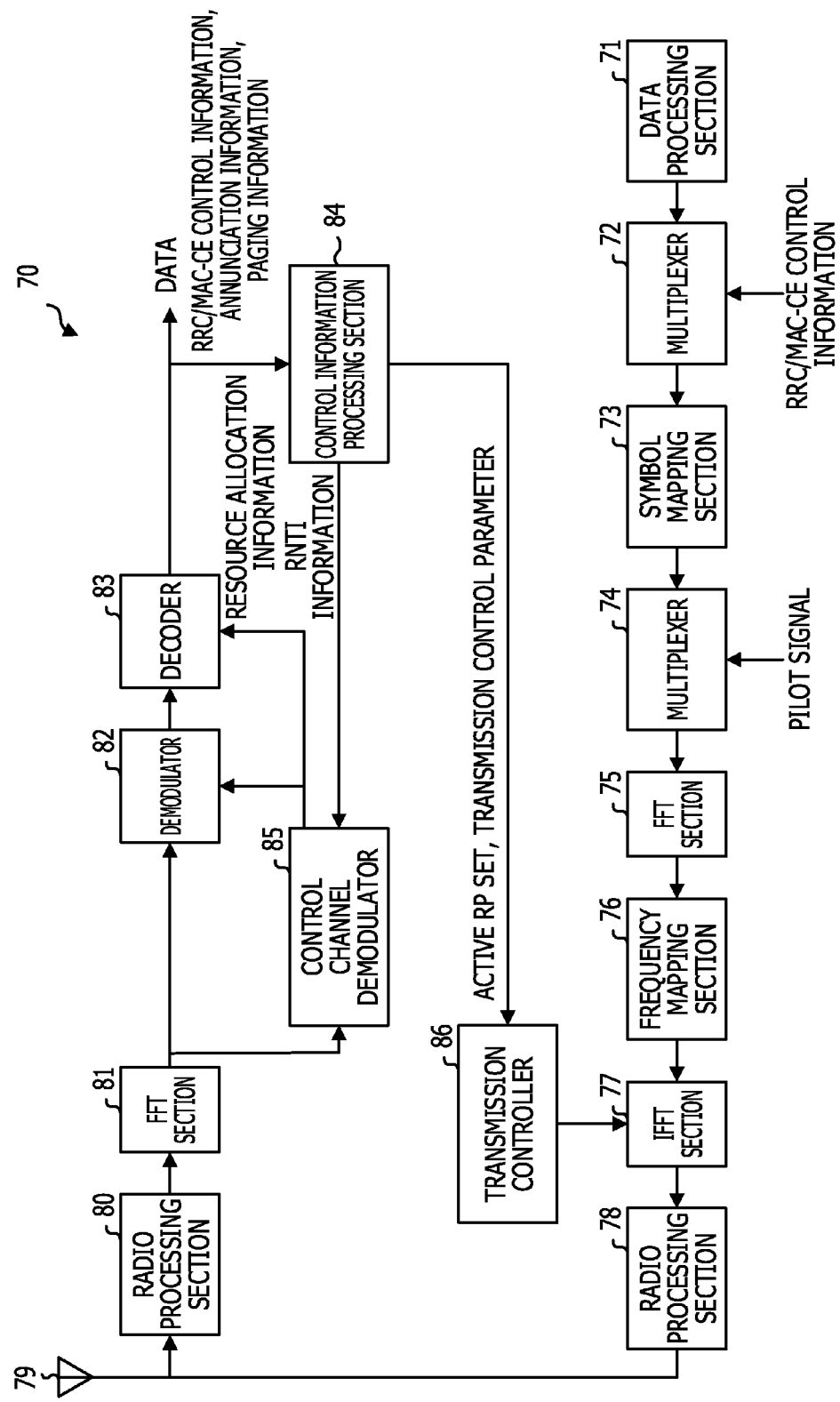
FIG. 8 is a functional block diagram illustrating a configuration of a radio terminal in the radio communication system according to the second embodiment.

FIG. 8 is a functional block diagram illustrating a configuration of the radio terminal 70 of the second embodiment. As illustrated in FIG. 8, the radio terminal 70 has a data processing section 71, multiplexer 72, symbol mapping section 73, multiplexer 74, FFT section 75, frequency mapping section 76, IFFT section 77, radio processing section 78, transmission/reception antenna 79, radio processing section 80, FFT section 81, demodulator 82, decoder 83, control information processing section 84, control channel demodulator 85, and transmission controller 86.

The transmission/reception antenna 79 is capable of switching between transmission use and reception use and, in the transmission use, signals output from the radio processing section 78 are transmitted via the transmission/reception antenna 79. In the reception use, signals received via the transmission/reception antenna 79 are input to the radio processing section 80. The antenna may be configured to be a separate entity for transmission and for reception, respectively. The antenna may also be configured to be a plurality of antennas.

The radio processing section 80 inputs received downlink radio signals and carries out A/D conversion or the like. The FFT section 81 carries out FFT processing to the radio-processed signals and acquires a subcarrier signal from received OFDM (orthogonal frequency division multiplexing) signals.

The demodulator 82 demodulates data signals by using the control information notified via an individual control channel. The decoder 83 decodes the demodulated data signals by using the control information notified via the individual control channel. The received data acquired through decoding is, for example, stored in a reception buffer and processed by the application processing section. The control information acquired through decoding is output to the control information processing section 84. The control information includes, for example, RRC information, MAC-CE (medium access control-control element) control information, annunciation information, and paging information. The reception quality is acquired from the acquired reference signal. As the reception quality, for example, an SIR (signal to interference ratio), SINR (signal to interference and noise ratio), RSRP, or RSRQ (reference signal received power) (computed as the received power value divided by the total power value) is used.

The control information processing section 84 processes and outputs the received control information to the control channel demodulator 85 and transmission controller 86. For example, the control information processing section 84 outputs RNTI (radio network temporary identity) information to the control channel demodulator 85. The control information processing section 84, for example, also outputs active RP set information used by the transmission controller 86 and transmission power control parameters. The control information processing section 84 outputs to the transmission controller 86 the active RP set information from candidate RP set information notified by RRC signaling and bitmap information specifying an active RP set notified by MAC signaling.

The control channel demodulator 85 demodulates control channel information based on the RNTI information and outputs control information to be used by the demodulator 82 and decoder 83.

The data processing section 71 generates data signals from transmission data. The transmission data is, for example, processed by the application processing section and stored in the transmission buffer.

The multiplexer 72 multiplexes the control signals generated from the RRC/MAC-CE control information to the data signals. The symbol mapping section 73 maps the transmission signals along the time axis direction. The multiplexer 74 multiplexes the reference signal (pilot signal) to the symbol-mapped signals. The FFT section 75 carries out FFT processing to the multiplexed signals. The frequency mapping section 76 maps the FFT-processed signals along the frequency direction. The IFFT processing section 77 carries out the IFFT processing to the frequency-mapped signals and generates transmission signals.

The radio processing section 78 carries out D/A (digital to analog) conversion processing or the like to the IFFT-processed signals and outputs the signals to the transmission/reception antenna 79.

The transmission controller 86 determines transmission power based on the control information. As for the uplink transmission power, for example, the transmission power on the uplink shared channel (PUSCH) in a cell c and of a sub-frame i is expressed by the equation (1).

Equation 1

$$P_{PUSCH,c}(i) = \min\left\{ \begin{array}{l} P_{CMAX,c}(i), \\ 10\log_{10}(M_{PUSCH,c}(i)) + P_{0\_PUSCH,c}(j) + \\ \alpha_c(j) \cdot PL_c + \Delta_{TF,c}(i) + f_c(i) \end{array} \right\} [dBm] \quad (1)$$

where $P_{MAX,c}(i)$ is a maximum transmission power, $M_{PUSCH,c}(i)$ is a size of an allocated frequency resource (RB; resource block), $P_{0\_PUSCH,c}(j)$ is a target value of the reception level in, for example, the mode for the dynamic scheduling (j=1), $PL_c$ is a path loss (propagation loss) estimated by using downlink signals, and a is a path loss coefficient (which indicates a rate at which the path loss is compensated). $D_{TF,c}(i)$ is an offset value for each modulation and coding scheme (MCS; modulation and coding scheme) and $f_c(i)$ is an offset value by the closed-loop control using a TPC command.

The parameters $P_{0\_PUSCH,c}(j)$ and a, which are related to the open loop TPC for the compensation of path loss, are stored in the radio terminal 70 or notified by the ratio station 50 in advance and selected according to the active RP set.

If a plurality of RPs exist, methods to convert the path loss, an object of the compensation by the TPC in the above-described equation (1), include the following equations (a) to (d). In these equations, $PL_{serving}$ is a path loss at an RP in a connected cell, and PL1, PL2, . . . , PLN are path losses at the RPs in the serving cell and coordinated cells.

Equation 2

Conversion Method (*a*): $PL=PL_{serving}$ \quad (2)

Conversion Method (*b*): $PL=\max\{PL_1, PL_2, \ldots, PL_N\}$ \quad (3)

Conversion Method (*c*): $PL=\min\{PL_1, PL_2, \ldots, PL_N\}$ \quad (4)

Conversion Method (*d*):

$$PL = \frac{1}{1/PL_1 + 1/PL_2 + \ldots 1/PL_N} \quad (5)$$

The conversion method (a) compensates the path loss in the serving cell. The conversion method (b) compensates the largest path loss in the serving cell and coordinated cells. The conversion method (c) compensates the smallest path loss in the serving cell and coordinated cells. The conversion method (d) compensates a non-linear averaged path loss (path loss converted from the gain of JR).

The hardware configuration of the radio station 50 in the radio communication system according to the second embodiment is similar to the hardware configuration of the radio station 10 in FIG. 4. The reception antenna 51, radio processing section 52, radio processing section 65, and transmission antenna 66 of the radio station 50 are implemented by, for example, antennas and RF circuits. The FFT section 53, demodulator 54, decoder 55, MAC/RLC processing section 56, radio resource controller 57, MAC controller 58, packet generator 59, MAC scheduler 60, encoder 61, modulator 62, multiplexer 63, and IFFT section 64 of the radio station 50 are implemented by, for example, integrated circuits such as a DSP or integrated circuits such as a CPU.

The hardware configuration of the radio terminal 70 in the radio communication system according to the second embodiment is similar to the hardware configuration of the mobile terminal 40 in FIG. 5. The radio processing section 78, transmission/reception antenna 79, and radio processing section 80 of the radio terminal 70 are implemented by, for example, antennas and RF circuits. The data processing section 71, multiplexer 72, symbol mapping section 73, multiplexer 74, FFT section 75, frequency mapping section 76, IFFT section 77, FFT section 81, demodulator 82, decoder 83, control information processing section 84, control channel demodulator 85, and transmission controller 86 of the radio terminal 70 are implemented by, for example, integrated circuits such as a CPU.

Next, an operation of the radio communication system of the second embodiment will be described.

As a precondition, in the radio communication system of the second embodiment, as described above, three radio stations 50 are placed so as to be able to carry out the CoMP communication as communication points individually. One radio station 50 is a serving cell for the radio terminal 70 and carries out CoMP processing between three radio stations 50 collectively. When data communication is carried out, communication points which are actually used in the CoMP communication by the radio terminal 70 are determined from the CoMP-communicable communication points.

Figure 9:
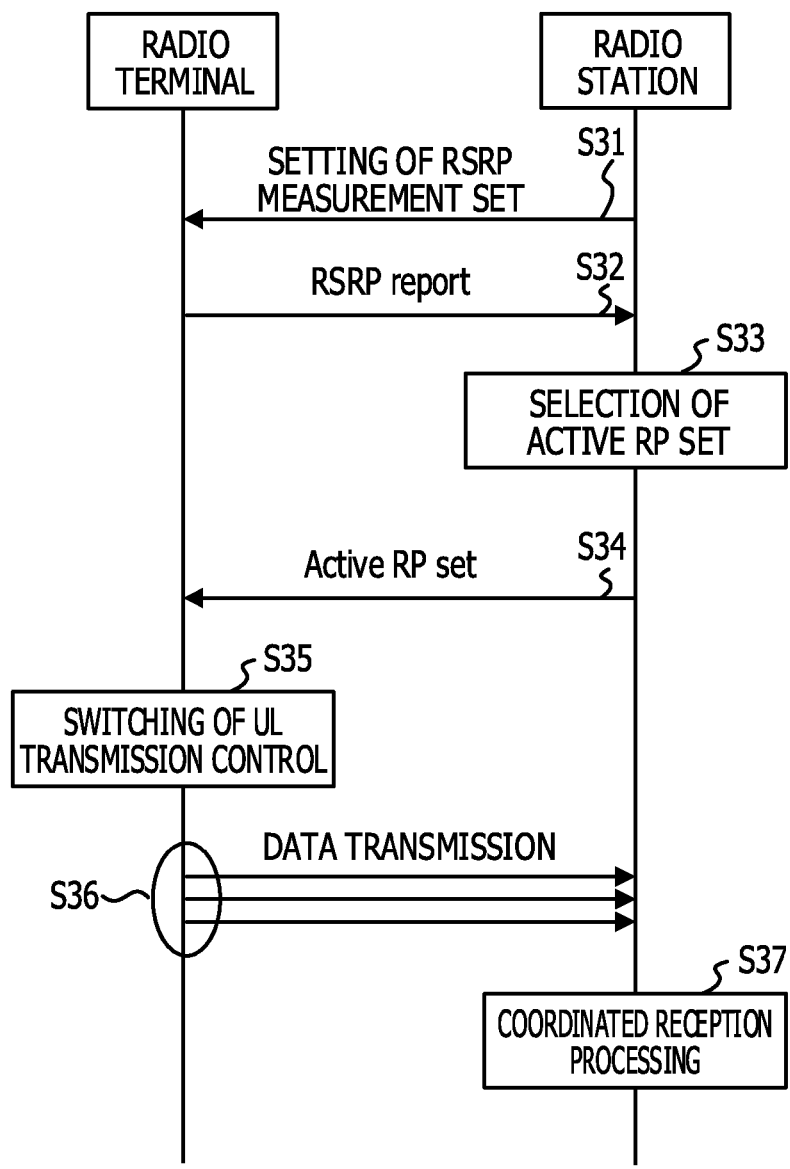
FIG. 9 is an explanatory diagram about an operation of the radio communication system according to the second embodiment.

A sequence diagram illustrating a generally conceivable operation of the CoMP communication is presented in FIG. 9 first as a related art. As illustrated in FIG. 9, a radio station notifies control information on the acquisition of reception quality on a radio terminal, RSRP measurement set information (S31). The radio terminal receives the notified control information. Next, by using the received control information, the radio terminal receives a pilot signal from a plurality of predetermined communication points of CoMP-communicable communication points and acquires reception quality for each communication point. The radio terminal then transmits reception quality information, RSRP report, to the radio station (S32).

Next, when a schedule to receive a signal from the radio terminal 40 is created, the radio station, based on the information on the reception quality for each communication point on the radio terminal, selects an active RP set, of the plurality of CoMP communicable communication points, to be used to receive a signal from the radio terminal in the uplink CoMP communication (S33). In this process, the communication points to be used in the signal reception are adjusted dynamically in a relatively short cycle by the radio station 50. The radio station 50 then notifies the radio terminal 70 of the active RP set (S34). In the active RP set information, each reception point is specified by, for example, pre-assigned identification information. Next, the radio terminal 70, according to the active RP set, switches transmission control (S35) and transmits data (S36). Next, the radio station 50 acquires a signal received individually at each reception point and carries out coordinated reception processing (for example, combining processing) (S37).

Figure 10:
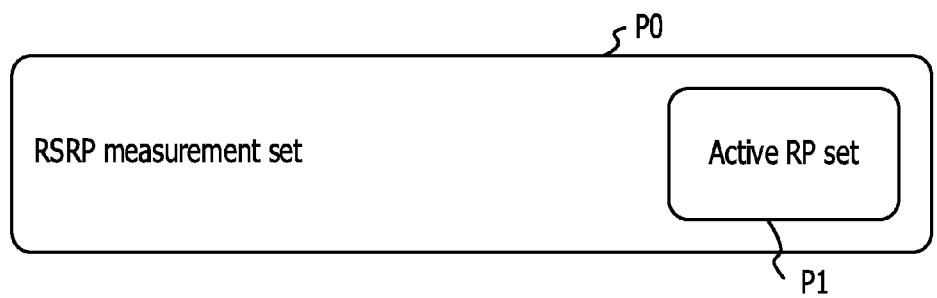
FIG. 10 is an explanatory diagram about the operation of the radio communication system according to the second embodiment.

The selection of an active RP set in the above-described case is illustrated exemplarily in FIG. 10. If a set P0 of RSRP measurement sets, which are notified in step S31, is considered as a parent set, in step S32, a set P1 of active RP sets may have the variously-changeable number and combinations of active RP sets. In order to transmit the identification information of such variously changeable active RP sets, a radio resource large enough to be able to transmit the identification information of all RSRP measurement sets has to be obtained. Such identification information has also to be notified in a relatively short cycle in step S34. In this case, an increase in the amount of signaling is caused, which may lead to an interruption to an improvement in communication performance.

Figure 11:
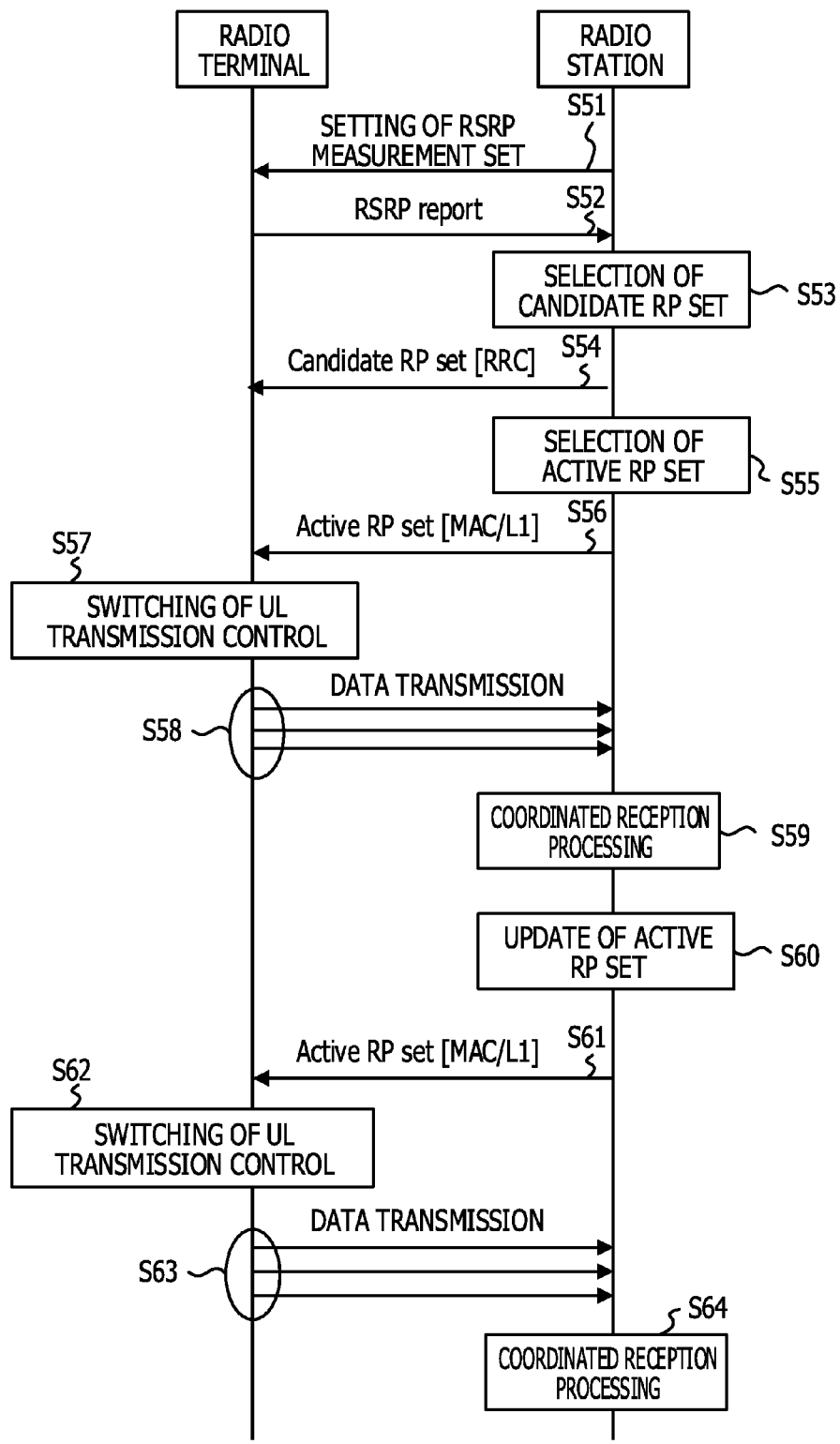
FIG. 11 is a sequence diagram to describe an operation of the radio communication system according to the second embodiment.
Figure 12:
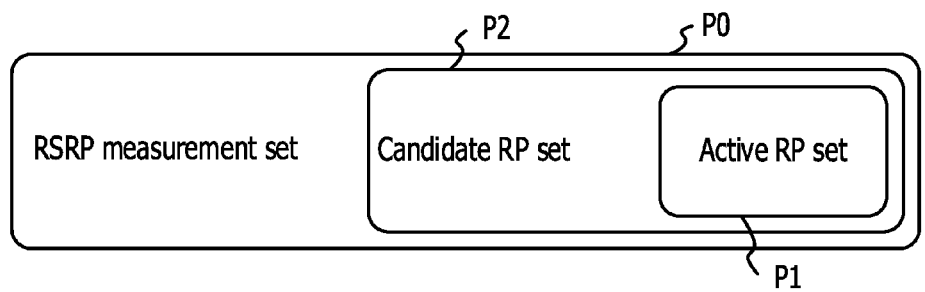
FIG. 12 is an explanatory diagram about notification of an RP set of the second embodiment.

Taking into account the above, a CoMP communication operation of the radio communication system of the second embodiment will be described with reference to FIGS. 11 and 12. FIG. 11 is a sequence diagram to describe an operation of CoMP communication of the radio communication system and FIG. 12 is an exemplary diagram illustrating selection of an active RP set.

As illustrated in FIG. 11, the radio station 50 notifies control information on the acquisition of reception quality on the radio terminal 70, RSRP measurement set (S51). In FIG. 12, a set P0 of RSRP measurement sets is illustrated. Next, the radio terminal 70, using the received control information, receives pilot signals from a plurality of predetermined communication points of CoMP-communicable communication points and acquires reception quality for each communication point. The radio terminal 70 then transmits reception quality information, RSRP report, to the radio station 50 (S52).

Next, the radio station 50 selects a candidate reception point set, which contains candidate reception points, of a plurality of CoMP-communicable transmission points, to receive a signal from the radio terminal 70 in the uplink CoMP communication, based on the information on reception quality for each communication point on the radio terminal 70 (S53). For example, the predetermined number of communication points in decreasing order of reception quality or the communication points which have reception quality values higher than a predetermined level are selected from the communication points. In FIG. 12, a set P2 of candidate RP sets is exemplified. As illustrated in FIG. 12, fewer communication points than the number of communication points in the RSRP measurement set (set P0) are selected as a candidate RP set (set P2). With this method, fewer communication points than the number of all CoMP-communicable communication points are selected as a candidate RP set.

Next, the radio station 50 notifies the radio terminal 70 of the candidate RP set (S54). This notification is carried out by, for example, RRC signaling. In this processing, because fewer communication points than the number of all CoMP-communicable communication points are selected as the candidate RP set, the amount of signaling is reduced compared with the case in which the identification information of all communication points is notified. In this processing, the radio station 50 may collectively notify information for the configuration of transmission control corresponding to the candidate RP set.

Next, when a schedule for the reception of a signal from the radio terminal 70 is created, the radio station 50 selects an RP set to be actually used for the signal reception (active RP set) (S55). In FIG. 12, a set P1 of active RP sets is exemplified. As illustrated in FIG. 12, an active RP set (set P1) is selected from within the candidate RP set (set P2). For example, as illustrated in FIG. 12, because fewer communication points than the number of communication points in the RSRP measurement set (set P0) are selected as the candidate RP set (set P2), the possible number and combinations of reception points are reduced compared with the case in which reception points are selected from the RSRP measurement set (set P0).

Next, the radio station 50 notifies the radio terminal 70 of the active RP set (S56). The active RP set is notified by, for example, L1 signaling or MAC signaling via an individual control channel. In this notification, the active RP set is notified by, for example, information specifying which reception point in the candidate RP set is used. With this method, for example, as illustrated in FIG. 12, because fewer communication points than the number of the communication points in the RSRP measurement set (set P0) are selected as the candidate RP set (set P2), the possible number and combinations of reception points are reduced, causing the amount of signaling to be reduced compared with the case in which information specifying reception points from within the RSRP measurement set (set P0) is notified. In this processing, the active RP set is notified as information specifying whether or not each communication point included in the candidate RP set is used by {0, 1}, that is, in a bitmap format.

In FIGS. 13 to 15, tables 100A to 100C exemplifying the active RP set are illustrated. In the tables 100A to 100C, information of 3 bits length specifying by {0, 1} the active RP set selected from a candidate reception point set including three candidate reception points is illustrated. With this format, the amount of signaling is reduced compared with the case in which the identification information itself of actually-used reception points is notified individually.

Next, the radio terminal 70 switches transmission control according to the active RP set (S57). Information to be set includes, for example, a computation method of transmission power, parameters used in the computation of the transmission power, and so on. With this information, setting of the transmission control is properly carried out according to the reception points to be actually used.

Next, the radio terminal 70 transmits data according to the set transmission control (S58). The transmitted data is received by each reception point individually.

Next, the radio station 50 acquires signals received individually by each reception point and carries out coordinated reception processing (for example, combining processing) (S59). With this processing, a reduction in inter-communication point interference and an improvement in reception signal strength are achieved.

Next, when a schedule of signal reception from the radio terminal 40 is created, the radio station 50 updates an RP set which is actually used for the signal reception (S60). Next, the radio station 50 notifies the radio terminal 70 of the active RP set (S61). In this notification, the notification may be carried out only in the case in which a change takes place in the active RP set. Next, the radio terminal 70 switches transmission control according to the active RP set (S62). With this processing, setting of the transmission control is carried out properly according to the reception points to be actually used. Next, the radio terminal 70 transmits data according to the set transmission control (S63). The transmitted data is received by each reception point individually. Next, the radio station 50 acquires the signal received individually by each reception point and carries out coordinated reception processing (for example, combining processing) (S64). With this processing, a reduction in inter-communication point interference and an improvement in reception signal strength are achieved.

As described above, according to the second embodiment, communication performance may be improved in the radio communication system carrying out the CoMP communication.

In the second embodiment, the radio communication system may be implemented by, for example, configuring the three radio stations 50 to be base stations. In this case, the three radio stations 50 may, for example, be implemented as independent eNodeBs. Alternatively, in the first embodiment, the radio communication system may be implemented by, for example, configuring one radio station 50 to be a control unit of a base station and the other radio stations as remote units of the base station. In this case, the control unit may be implemented as, for example, a concentrated eNodeB and the remote units as, for example, RRHs the concentrated eNodeB has. For example, the control unit is connected to the remote units via a wired connection such as an optical cable. The control unit forms a cell and each of the remote units forms a cover area overlapping the cell. In this case, the control unit and remote units may use common cell identification information.

Although the radio communication system is described to have three radio stations 50, the configuration is not limited to this and the number of radio stations is arbitrary.

Third Embodiment

Figure 16:
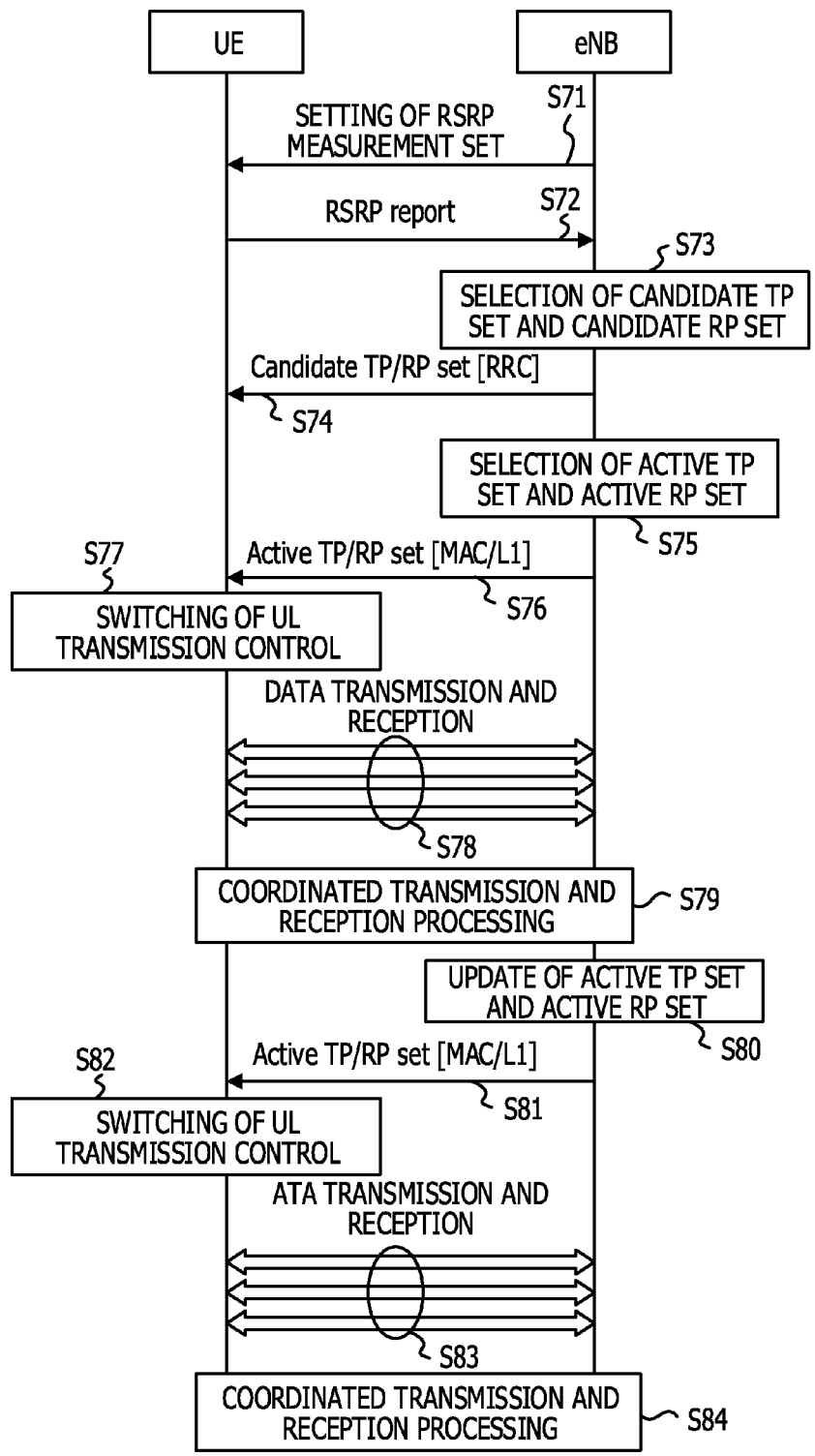
FIG. 16 is a sequence diagram to describe an operation of a radio communication system according to a third embodiment.
Figure 17:
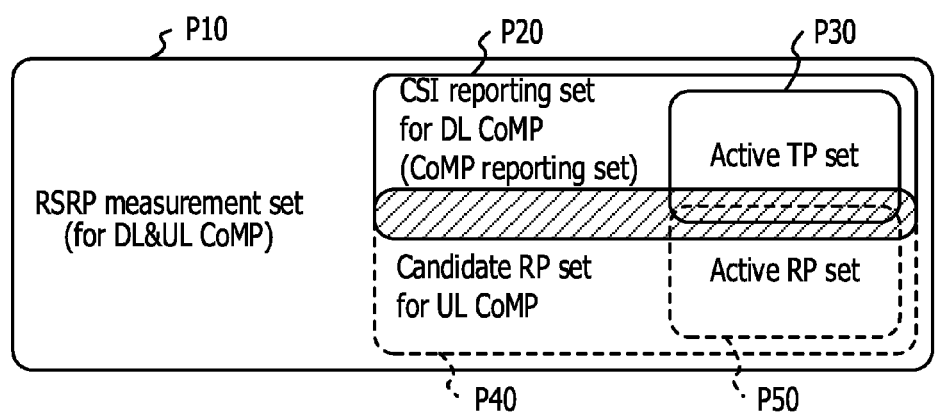
FIG. 17 is an explanatory diagram about notification of an RP set of the third embodiment.

FIG. 16 is a sequence diagram to describe an operation of CoMP communication of a radio communication system according to a third embodiment and FIG. 17 is an exemplary diagram illustrating a selection of an active RP set. The overall configuration of the radio communication system according to the third embodiment is similar to the configuration of the radio communication system 90 in FIG. 1.

A radio station according to the third embodiment differs from the radio station 50 of the second embodiment in terms of operations concerning a radio resource controller 57 and MAC controller 58.

In the third embodiment, the radio resource controller 57 determines a candidate RP set based on reception quality for each communication point measured by a radio terminal 40 and also determines a set of candidate transmission points (candidate TP (transmission point) set) which are candidates to transmit a signal in the downlink CoMP communication. The radio resource controller 57 then outputs to a packet generator 59 information specifying the union of the candidate RP set and the candidate TP set (candidate TP set).

In the third embodiment, the MAC controller 58 outputs to the packet generator 59 data specifying an active RP set which is determined by scheduling of signal reception and also outputs to the packet generator 59 data specifying an active transmission point set (active TP set) which is determined by scheduling of signal transmission.

The other configuration of the radio station according to the third embodiment is similar to the configuration of the radio station 50 of the second embodiment in FIG. 7. The hardware configuration of the radio station according to the third embodiment is also similar to the hardware configuration of the radio station 50 of the second embodiment.

The radio terminal according to the third embodiment differs from the radio station 70 of the second embodiment in terms of operations concerning a control information processing section 84.

The control information processing section 84 processes and outputs received control information to a control channel demodulator 85, transmission controller 86, and multiplexer 72. For example, the control information processing section 84 outputs the active TP set information. The control information processing section 84 outputs the candidate RP/TP set information notified by RRC signaling and the active TP set information from bitmap information specifying the active TP set notified by MAC signaling.

The other configuration of the radio terminal according to the third embodiment is similar to the radio terminal 70 of the second embodiment illustrated in FIG. 8. The hardware configuration of the radio terminal according to the third embodiment is also similar to the hardware configuration of the radio terminal 70 of the second embodiment.

Next, an operation of the radio communication system of the third embodiment will be described below.

As illustrated in FIG. 16, in the third embodiment, the radio station 50 (stated as eNB in FIG. 16) notifies control information on the acquisition of reception quality, RSRP measurement set, on the radio terminal 70 (stated as UE in FIG. 16) (S71). In FIG. 17, a set P10 of the RSRP measurement sets is exemplified. Next, the radio terminal 70, by using the received control information, receives reference signals from a plurality of predetermined communication points of CoMP-communicable communication points and acquires reception quality for each communication point. The radio terminal 70 then transmits reception quality information, RSRP report, to the radio station 50 (S72).

Next, the radio station 50, based on the information on the reception quality for each communication point on the radio terminal 70, selects a candidate reception point set, which includes candidates to receive a signal from the radio terminal 70 in the uplink CoMP communication, and a candidate transmission point set, which includes candidates to transmit a signal to the radio terminal 70 in the downlink CoMP communication, of a plurality of CoMP-communicable communication points (S73). For example, the predetermined number of communication points in decreasing order of reception quality or the communication points which have reception quality values higher than a predetermined level are selected from the communication points. Then, the union of the candidate reception point set and the candidate transmission point set is extracted. In FIG. 17, a set P20 of candidate RP sets and a set P40 of candidate TP sets are exemplified. In FIG. 17, the area marked with hatched lines is an overlap between the set P20 of candidate RP sets and the set P40 of candidate TP sets. As illustrated in FIG. 17, fewer communication points than the number of communication points in the RSRP measurement set (set P10) are selected as the candidate RP set (set P20) and the candidate TP set (set 40). With this method, fewer communication points than the number of all CoMP-communicable communication points are selected as the candidate RP set and candidate TP set.

Next, the radio station 50 notifies the radio terminal 70 of information specifying the union of the candidate RP set and candidate TP set (S74). This notification is carried out by, for example, RRC signaling. In this notification, because fewer communication points than the number of all CoMP-communicable communication points are selected as the candidate RP set and candidate TP set, the amount of signaling is reduced compared with the case in which the identification information of all communication points is notified. Because the amount of the identification information of notified communication points may also be reduced by the amount of the overlap between the candidate RP points and candidate TP points, a reduction in the amount of signaling and an improvement in communication performance are achieved. In this notification, the radio station 50 may notify information for transmission control setting corresponding to the candidate RP set.

Next, when a schedule of signal reception from the radio terminal 70 is created, the radio station 50 selects an active RP set, which includes reception points to be actually used in the signal reception, and an active TP set, which includes transmission points to be actually used in signal transmission (S75). In FIG. 17, a set P30 of active RP sets and a set P50 of active TP sets are exemplified. As illustrated in FIG. 17, the active RP set (set P30) is selected from the candidate RP set (set P20) and the active RP set (set P50) is selected from the candidate TP set (set P40). As illustrated in FIG. 17, for example, because fewer communication points than the number of communication points in the RSRP measurement set (set P10) are selected as the candidate RP set (set P20) and candidate TP set (set P40), the possible number and combinations of reception points and transmission points may be reduced compared with the case in which reception points and transmission points are selected from the RSRP measurement set (set P0).

Next, the radio station 50 notifies the radio terminal 70 of the active RP set and active TP set (S76). The active RP set and active TP set are notified by, for example, L1 signaling or MAC signaling via an individual control channel. In this notification, the active RP set is notified by, for example, information specifying which reception point in the candidate RP set is used. The active TP set is also notified by, for example, information specifying which transmission point in the candidate TP set is used. With this method, as illustrated in FIG. 17, for example, because fewer communication points than the number of communication points in the RSRP measurement set (set P10) are selected as the candidate RP set (set P20) and candidate TP set (set P40), the possible number and combinations of reception points and transmission points are reduced and the amount of signaling is reduced compared with the case in which information specifying communication points from the RSRP measurement set (set P10) is notified. Because fewer communication points than the number of all communicable communication points are selected as the candidate RP set, the possible number and combinations are reduced and the amount of signaling is reduced compared with the case in which information specifying communication points from all CoMP-communicable set is notified. In this notification, the active RP set and active TP set are notified by, for example, information specifying whether or not each communication point included in the candidate RP set and candidate TP set is used by {0, 1}, that is, in a bitmap format. With this method, the amount of signaling is reduced compared with the case in which the identification information itself of actually-used reception points and transmission points is notified.

Next, the radio terminal 70 switches transmission control according to the active RP set (S77). The information to be set includes, for example, a computing method of transmission power, parameters used in the computation of transmission power, and so on. With this information, transmission control setting is properly carried out according to the reception points to be actually used.

Next, the radio terminal 70 transmits data according to the set transmission control (S78). The transmitted data is received by each reception point individually. The radio terminal 70 also receives data transmitted by each transmission point.

Next, the radio station 50 acquires signals received by each reception point individually and carries out coordinated transmission and reception processing (for example, combining processing) (S79). The radio terminal 70 also carries out combining processing of signals transmitted by each transmission point. With this processing, a reduction in inter-communication point interference and an improvement in reception signal strength are achieved.

Next, the radio station 50, in a similar manner to S75, when a schedule of signal reception from the radio terminal 40 is created, updates the active RP set and active TP set to be actually used in the signal reception (S80). Next, the radio station 50, in a similar manner to S76, notifies the radio terminal 70 of the active RP set and active TP set (S81). In this notification, the active RP set may be notified only if a change takes place to the active RP set. The active TP set may also be notified only if a change takes place to the active TP set. Next, the radio terminal 70, in a similar manner to S77, switches transmission control according to the active RP set (S82). With this processing, transmission control setting is properly carried out according to the reception point to be actually used. Next, the radio terminal 70, in a similar manner to S78, transmits data according to the set transmission control (S83). The transmitted data is received by each reception point individually. The radio terminal 70 also receives data transmitted by each transmission point. Next, the radio station 50, in a similar manner to S79, acquires signals received by each reception point individually and carries out coordinated transmission and reception processing (for example, combining processing) (S84). With this method, a reduction in inter-communication point interference and an improvement in reception signal strength are achieved.

As described above, according to the third embodiment, communication performance may be improved in the radio communication system carrying out the CoMP communication.

Fourth Embodiment

Figure 18:
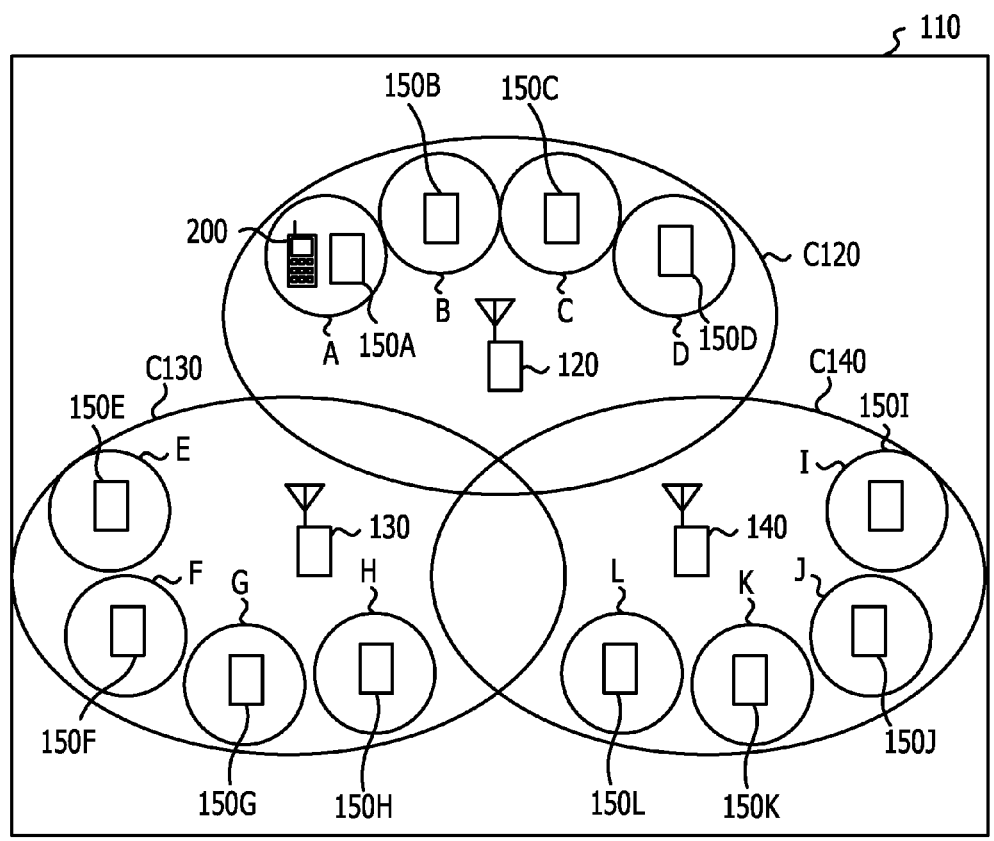
FIG. 18 is a diagram illustrating a configuration of a radio communication system according to a fourth embodiment.

FIG. 18 is a diagram illustrating a configuration of a radio communication system 110 according to a fourth embodiment.

In the radio communication system 110, as illustrated in the next drawing (FIG. 19), a radio station 160 has a control unit 120 and remote units 150A to 150D. Similarly, another radio station (not illustrated) has a control unit 130 and remote units 150E to 150H. Similarly, yet another radio station (not illustrated) has a control unit 140 and remote units 150I to 150J. The control units 120, 130, and 140 may be implemented as, for example, eNodeBs. The remote units 150A to 150L may be implemented as, for example, RRHs which eNodeBs have. The control units 120, 130, and 140 and remote units 150A to 150L have antennas individually and are arranged at locations apart from one another. The control units 120, 130, and 140 and remote units 150A to 150L correspond to communication points, respectively. The control units 120, 130, and 140 form cells C120, C130, and C140 and the remote units 150A to 150L form cover areas A to L, respectively. A radio terminal 200 exists in the cell C120. The radio terminal 200 is included in the cover area A at the same time.

The control unit 120 and remote units 15A to 150D communicate with one another via a wired connection. The control unit 130 and remote units 150E to 150H communicate with one another via the wired connection. The control unit 140 and remote units 150I to 150J communicate with one another via the wired connection.

In the radio communication system 110, the control units 120, 130, and 140 of the radio station 160, another radio station (not illustrated), and yet another radio station (not illustrated) and the remote units 150A to 150L exist together and at least a portion of these units carries out CoMP communication. For example, in the downlink CoMP communication with the radio terminal 200, one or more communication points selected from the control units 120, 130, and 140 and the remote units 150A to 150L as a set to be used in the downlink CoMP communication carry out joint transmission of data to the radio terminal 200. In the uplink CoMP communication with the radio terminal 200, for example, one or more communication points selected from the control units 120, 130, and 140 and the remote units 150A to 150L as a set used in the uplink CoMP communication receive data from the radio terminal 200 and combine received signals between the communication points.

Figure 19:
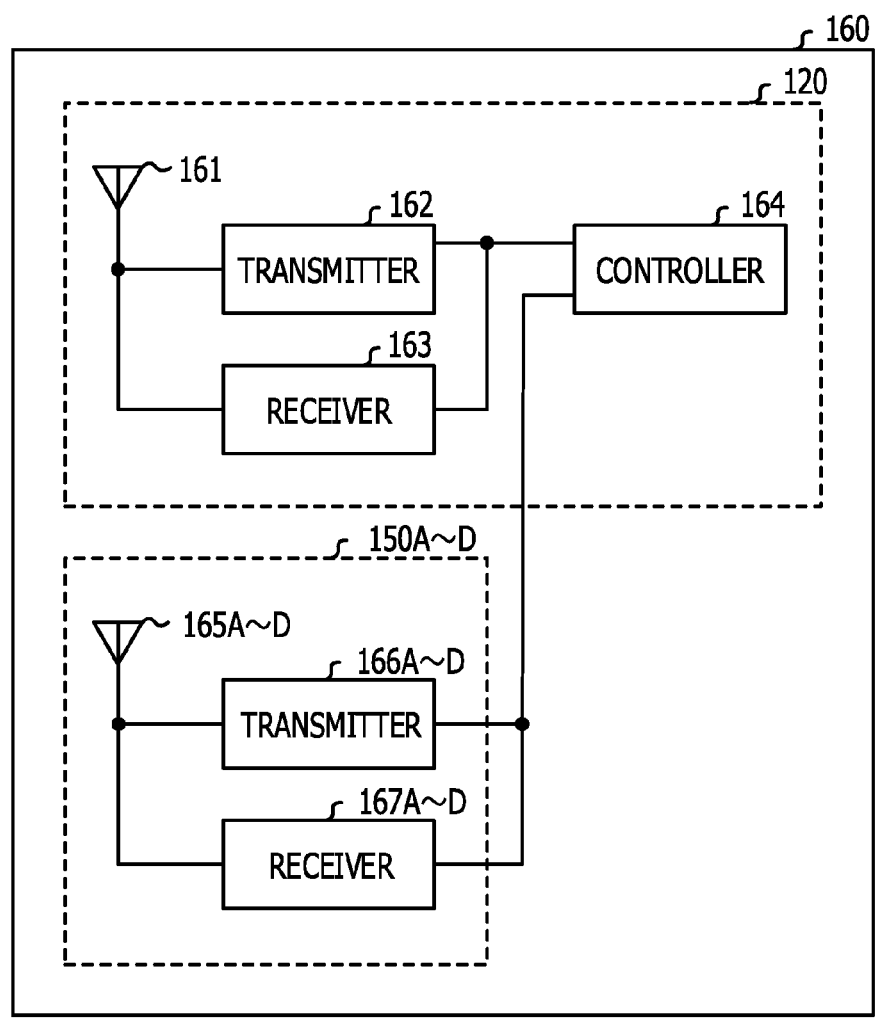
FIG. 19 is a functional block diagram illustrating a configuration of a radio station according to the fourth embodiment.

FIG. 19 is a functional block diagram illustrating a configuration of the radio station 160. As illustrated in FIG. 19, the control unit 120 of the radio station 160 has an antenna 161, transmitter 162, receiver 163, and controller 164. The remote units 150A to D of the radio station 160 have antennas 165A to D, transmitters 166A to D, and receivers 167A to D, respectively. These components are interconnected so as to be able to input and output signals and data in one direction or both directions. The antennas 165A to D and the antenna 161 have similar configurations. The transmitters 166A to D and the transmitter 162 have similar configurations. The receivers 167A to D and the receiver 163 have similar configurations. The functional configurations and hardware configurations of another radio station (not illustrated) and yet another radio station (not illustrated) are similar to the configuration of the radio station 160. The transmitter 162 and receiver 163 have similar configurations to the transmitter and receiver of the first embodiment.

Figure 20:
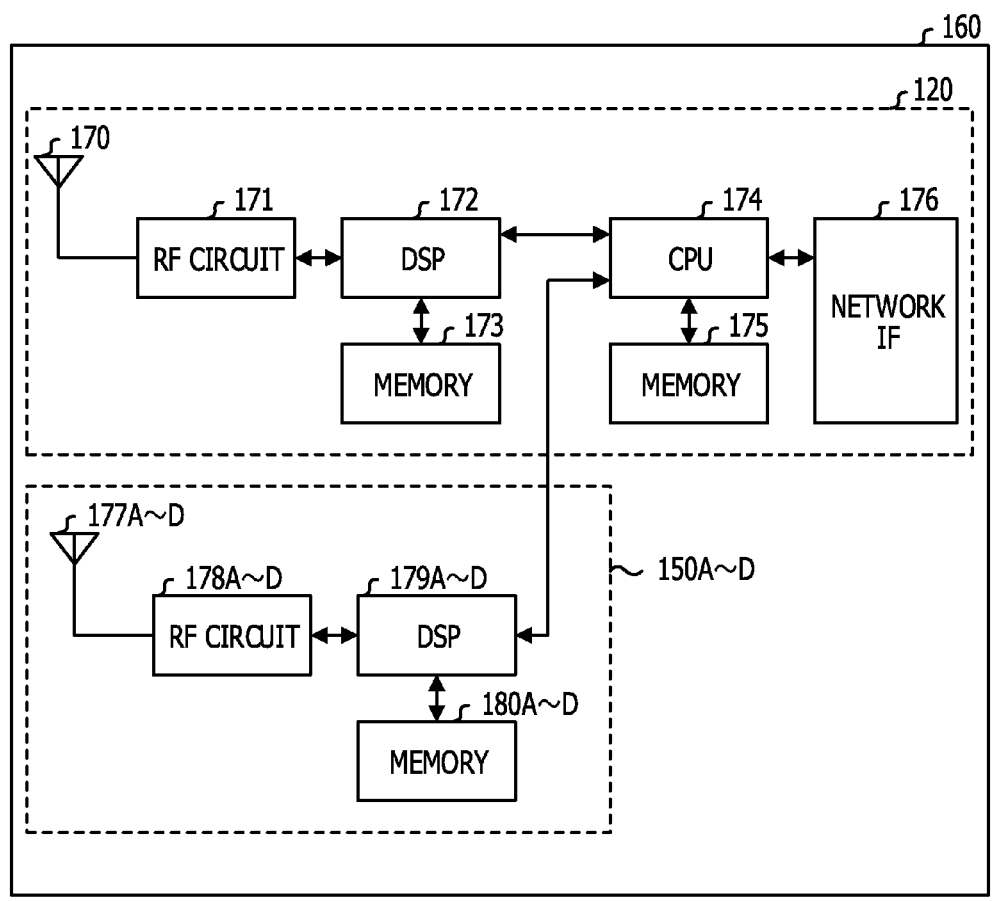
FIG. 20 is a functional block diagram illustrating a configuration of a radio terminal according to the fourth embodiment.

FIG. 20 is a diagram illustrating a hardware configuration of the radio station 160. As illustrated in FIG. 20, the radio station 160 has, for example, RF circuits 171 and 178A to D equipped with antennas 170 and 177A to D, DSPs 172 and 179A to D, memories 173 and 180A to D, CPU 174, memory 175, and network IF 176 as hardware components. The CPU 174 is connected so as to be able to input and output various signals and data via the network IF 176 such as a switch. The memories 173, 180A to D, and 175 include, for example, at least one of a RAM such as an SDRAM, ROM, and flash memory and store programs, control information, and data. The transmitters 162 and 166A to D and receivers 163 and 167A to D are implemented by, for example, the RF circuits 171 and 178A to D and integrated circuits 172, 179A to D. The controller 164 is implemented by an integrated circuit such as, for example, the CPU 174. The control unit 120 corresponds to components 170 to 176 and the remote units 150A to D correspond to components 177A to D, 178A to D, 179A to D, and 180A to D.

The functional configuration and hardware configuration of the radio terminal 200 according to the fourth embodiment are similar to the configuration of the radio terminal 40 of the first embodiment.

In the CoMP communication operation of the radio communication system 110 of the fourth embodiment, as is the case with the description of FIG. 6 in the first embodiment, a set of candidate reception points is selected and notified to the radio terminal 200. In this operation, because fewer communication points than the number of all CoMP-communicable communication points are selected as the candidate RP set, the amount of signaling is reduced compared with the case in which the identification information of all communication points is notified. When a schedule of signal reception is created, active reception points are selected and notified to the radio terminal 200. In this notification, the active RP set is notified by, for example, information specifying which reception point in the candidate RP set is used. Because fewer communication points than the number of all CoMP-communicable communication points are selected as a candidate RP set, the possible number and combinations are reduced and the amount of signaling is reduced compared with the case in which information specifying communication points from within the CoMP-communicable set is notified. Moreover, in this notification, the active RP set is notified as, for example, information specifying whether or not each communication point included in the candidate RP set is used by {0, 1}, that is, in a bitmap format. With this method, the amount of signaling is reduced compared with the case in which the identification information itself of the reception points to be actually used is individually notified.

As described above, according to the fourth embodiment, communication performance may be improved in the radio communication system carrying out the CoMP communication.

In the fourth embodiment, the controller 164 of the control unit 120 outputs data signals and control signals which are transmitted to the transmitter 162 and transmitters 166A to D. The controller 164 also inputs received data and control information from the receiver 163 and receivers 167A to D. The other part is similar to the first embodiment.

The radio communication systems of the first embodiment to the fourth embodiment may be implemented, for example, as LTE-A systems. The radio communication systems of the first to fourth embodiments, however, may be applied to a radio communication system employing a communication method other than the LTE-A.

Moreover, the first to fourth embodiments are applicable, as the radio terminal, to a mobile terminal such as a mobile phone, smart phone, and PDA (personal digital assistant). The first to fourth embodiments are also applicable to various communication devices, such as a mobile relay station, which communicate with a base station.

Moreover, the first to fourth embodiments are applicable, as the radio station, to base stations of various sizes such as a macro base station and femto base station. The first to fourth embodiments are applicable to various communication devices, such as a relay station, which communicate with a mobile station.

Moreover, specific aspects of the distribution and integration of components of a radio station and radio terminal are not limited to the aspects of the first to fourth embodiments but may be configured by distributing or integrating all or a portion of the components functionally or physically in any unit with respect to various load, usage status, or the like. For example, a memory may be connected via the network or a cable as an external device of a radio station or radio terminal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication method, comprising:
   notifying a radio terminal of first set information, from at least one communication point among a plurality of communication points, based on information of a reception level on the radio terminal, the first set information specifying one or more candidates of reception points to receive a signal transmitted from the radio terminal among one or more communication points capable of coordinated communication from the plurality of communication points; and
   notifying, by a processor, the radio terminal of second set information, from at least one communication point among the plurality of communication points, in reception of a signal from the radio terminal, the second set information specifying one or more reception points to be used for reception of a signal transmitted by the radio terminal among one or more reception points specified in the first set information.

2. The radio communication method of claim 1, further comprising:
   changing a transmission control parameter for transmission of a signal from the radio terminal based on the second set information.

3. The radio communication method of claim 1, wherein the notifying of the second set information is executed with higher frequency than the notifying of the first set information.

4. The radio communication method of claim 1, wherein the notifying of the first set information uses RRC (radio resource control) signaling.

5. The radio communication method of claim 1, wherein the notifying of the second set information uses Layer 1 signaling or MAC (medium access control) signaling.

6. The radio communication method of claim 1, further comprising:
   acquiring, at the radio terminal, a reception level of a signal from a plurality of given communication points among the plurality of communication points;
   transmitting the acquired reception level to at least one communication point among the plurality of communication points; and
   determining a set of the one or more candidates of the reception points, based on path loss between the radio terminal and the plurality of given communication points in accordance with the reception level.

7. The radio communication method of claim 1, wherein the notifying of the first set information notifies, as the first set information, information specifying a union set of a set of the one or more candidates of the reception points and a set of one or more candidates of transmission points to transmit a signal to the radio terminal among the one or more communication points capable of coordinated communication, and
   the second set information specifies, using a bitmap format, whether or not each reception point which is a candidate to be included in the first set information.

8. A radio communication system, comprising:
   a first transmitter configured to notify a radio terminal of first set information, from at least one communication point among a plurality of communication points, based on information of a reception level on the radio terminal, the first set information specifying one or more candidates of reception points to receive a signal transmitted from the radio terminal among one or more communication points capable of coordinated communication from the plurality of communication points; and a second transmitter configured to notify the radio terminal of second set information, from at least one communication point among the plurality of communication points, in reception of a signal from the radio terminal, the second set information specifying one or more reception points to be used for reception of a signal transmitted by the radio terminal among one or more reception points specified in the first set information.

9. A radio station, comprising:

a memory; and a processor coupled to the memory and configured to:
   notify a radio terminal of first set information, based on information on reception quality on the radio terminal, the first set information specifying one or more candidates of reception points to receive a signal transmitted by the radio terminal among of one or more communication points capable of coordinated communication from a plurality of communication points, and
   notify the radio terminal of second set information, in reception of a signal from the radio terminal, the second set information specifying one or more reception points to be used for reception of a signal transmitted by the radio terminal among one or more reception points specified in the first set information.

10. A radio terminal comprising:

a memory; and a processor coupled to the memory and configured to:
   receive first set information notified based on information on reception quality on the radio terminal, from at least one communication point among a plurality of communication points, the first set information specifying one or more candidates of reception points to receive signals transmitted by the radio terminal among one or more communication points capable of coordinated communication from the plurality of communication points, and
   receive second set information notified in reception of a signal from the radio terminal, from at least one communication point among the plurality of communication points, the second set information specifying one or more reception points to be used to receive a signal transmitted by the radio terminal among one or more reception points specified in the first set information.

* * * * *